UNITED STATES PATENT OFFICE.

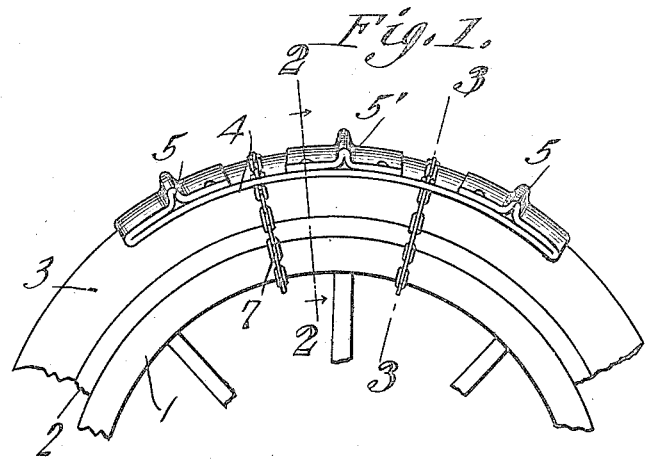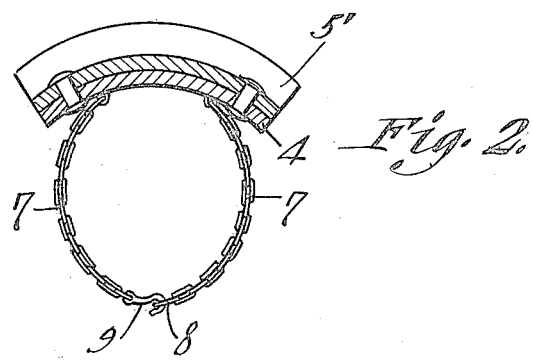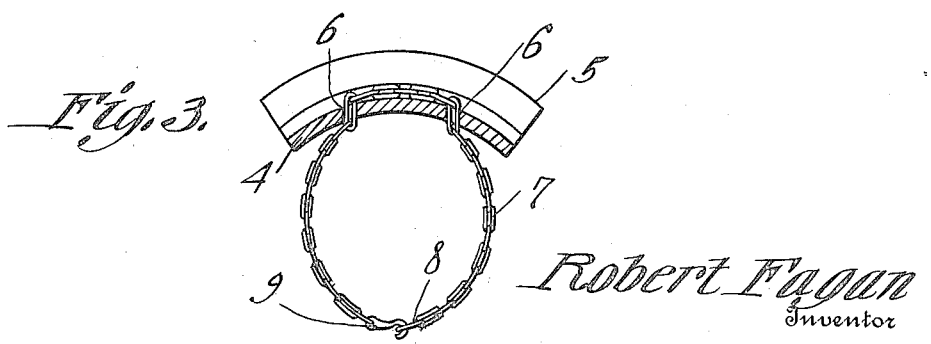

ROBERT FAGAN, OF MEACHAM, OREGON.

TRACTION DEVICE.

1,307,192.    Specification of Letters Patent.    Patented June 17, 1919.

Application filed April 16, 1918. Serial No. 228,895.

*To all whom it may concern:*

Be it known that I, ROBERT FAGAN, a citizen of the United States, residing at Meacham, in the county of Umatilla and State of Oregon, have invented a new and useful Traction Device, of which the following is a specification.

The subject of this invention is a shoe, and the main object of the invention is the provision of a shoe which may be detachably secured to the drive wheel of an automobile to prevent the wheel from slipping or spinning.

Another object within the contemplation of the invention is the provision of a shoe which may be readily placed in position upon the tire by an occupant of the vehicle, without the necessity of alighting from the vehicle.

A still further object contemplated by the invention is the provision of a simple, durable and efficient shoe.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

One practical embodiment of the invention is shown in the accompanying drawing; wherein:—

Figure 1 is a view in side elevation of a shoe constructed in accordance with the invention and showing the same in place upon a wheel;

Fig. 2 is a cross section of the device taken on the line 2—2 of Fig. 1;

Fig. 3 is a cross section taken on the line 3—3 of Fig. 1.

Referring to the drawing by numerals of reference:—

The usual wheel felly is indicated by the numeral 1, and encircling the felly is the rim 2 on which is secured the tire 3.

The shoe which forms the subject of the invention consists of a metallic plate 4, shaped to conform to the curve of the tire, and having its ends bent over upon itself. These bent over ends are further bent upon themselves, between their ends, to form the radially extending flanges or ribs 5, which ribs are positioned transversely of the plate 4. A flange 5' is also riveted or otherwise secured to the plate 4 midway between the ribs or flanges 5.

The plate 4 is provided with apertures 6, arranged in pairs between the flanges 5 and 5' for the reception of chains 7. The chains 7 are arranged transversely of the plate 4 and have their ends extending through the apertures in the plate, and the ends of the chains are provided with detachable couplings, herein shown as a ring 8 attached to one end of each chain and a hook 9 secured to the other end of each chain and adapted to be hooked through the ring to secure the chains about the felly, rim and tire, and hold the shoe firmly in place upon the tire.

While a specific form of coupling for the chains has been herein shown and described, it is to be understood that any of the well known structures designed for this purpose may be employed.

These plates may be made of heavy sheet metal and such metal be of either the smooth or corrugated variety as desired.

In practice, when the drive wheels of an automobile are in sand, on ice, or in a mud hole and unable to secure a grip for the purpose of producing traction, the occupant of the vehicle may place one of the shoes in place upon the tire of the drive wheel and, if this is not sufficient to cause the wheel to secure a sufficient grip, other plates may be added. Three plates are usually sufficient to cause the wheel to grip properly.

As these plates are separate, and comparatively small and easy to handle, the same may be placed upon the tire without the necessity for alighting from the vehicle which, when the vehicle is stalled in a mud hole, is a decided advantage.

Having thus described the invention, what is claimed as new and sought by Letters Patent, is:—

A traction device comprising a plate including a body and end portions, the plate being bent upon itself transversely to dispose the end portions parallel to the body and in contact therewith, the end portions conforming to the shape of the body, both longitudinally and transversely; a second plate superposed upon the body between said end portions and spaced therefrom, the second plate and the end portions being bent upon themselves transversely to form traction ribs constituting reinforcements for the end portions and for the second plate; and means for securing said end portions and the second plate to the body, thereby to afford reinforcements for the body.

In testimony that I claim the foregoing as my own, I have hereto affixed my signature in the presence of two witnesses.

ROBERT FAGAN

Witnesses:
W. B. Ross,
Geo. Peavey.